United States Patent Office 2,961,199
Patented Nov. 22, 1960

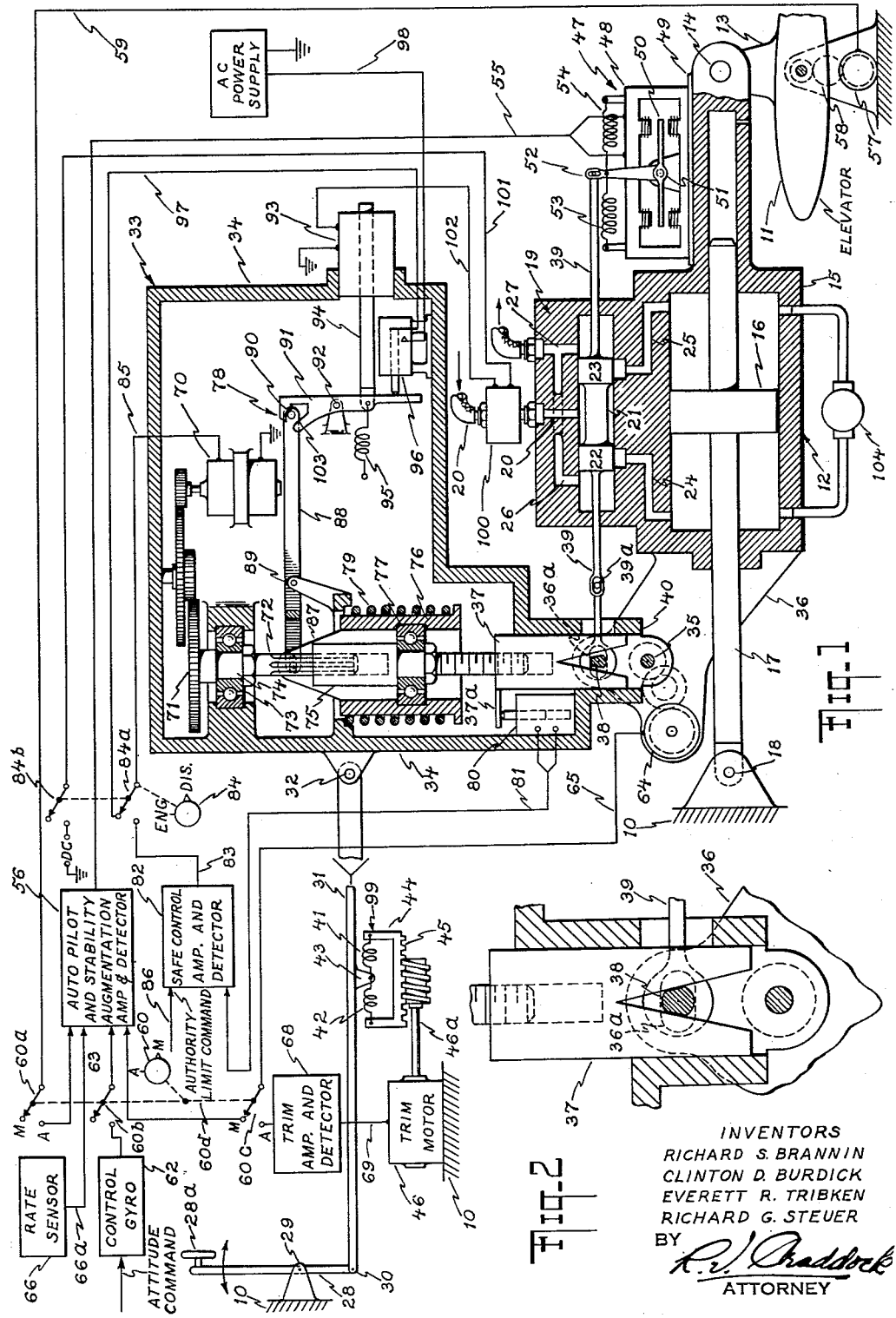

2,961,199

FLIGHT CONTROL SYSTEM

Richard S. Brannin, East Williston, Clinton D. Burdick, Great Neck, Everett Robert Tribken, Garden City, and Richard G. Steuer, Hicksville, N.Y., assignors to Sperry Rand Corporation, a corporation of Delaware Filed June 22, 1956, Ser. No. 593,093

26 Claims. (Cl. 244—76)

This invention relates to a system including a combination manual power booster, a stability augmentation servo system and an automatic pilot for dirigible craft. In a preferred embodiment as depicted in the drawings, the invention is employed on an aircraft in which the power motor of the system is connected to a steering member such as the craft's elevator surface.

With the advent of modern high speed dirigible craft especially aircraft, it requires considerable muscular effort on the part of the human pilot to provide sufficient force to position the steering member of the craft and maintain a desired flight condition. Systems which employ purely mechanical advantage means for increasing the pilot's force have been found inadequate. The systems generally used in modern high speed aircraft employ electric or hydraulic type servo systems for boosting the pilot's force to a level where it is operationally effective to position the control surface. Present systems of this type suffer from at least one of two disadvantages; either the system is not adapted to rapidly and precisely control the aircraft or if it is adapted for rapid and precise control, then adequate provision is lacking in the event of unduly large signal excursions or of a system malfunction. A further deficiency of present systems is the lack of accurate information provided to the pilot regarding the position of the control surface particularly when in an automatic mode. These and other limitations of integrated systems are overcome by the present invention.

One of the objects of the invention is to provide automatic control for the steering control means of a dirigible craft in which a single power motor performs functions of a manual power booster, damper servomotor and automatic pilot servomotor.

Another object of the invention is to provide an effective variable limit for the automatic control servomotor.

Another object of the invention is to provide a system utilizing manual control with or without stability augmentation in which the stability augmentation control may be effectively limited.

Another object of the invention is to provide adjustable servomotor authority for stability augmentation and automatic pilot system signals while providing full control for manual signals. The servomotor authority may be adjustable to maintain the structural integrity of the craft. In a preferred embodiment, a mechanical controller limits the electrical authority of the servo system by an adjustable authority means.

One of the features of the invention resides in the use of a single mechanical pin to control the adjustment of the servomotor authority and provide the direct mechanical connection between the pilot's control and the steering member whenever hydraulic power is not supplied to the servomotor, such as in ground handling.

A further feature of the invention is a snap action lock to return the steering member to the position of the pilot's control in case of loss of electrical power, reduction in the normal operating pressure of the hydraulic supply, or the desire of the pilot to obtain direct control.

Another feature of the present invention relates to the ability of the servo system to eliminate transients in the engaging procedure for the automatic pilot. This is accomplished by opening the adjustable limits on the electrical authority at a prescribed rate.

Another feature of the system is that the pilot's controls do not necessarily follow all the high frequency motion of the control surface required for stabilization but the surface and the pilot's controls do correspond in the steady state. Thus, the pilot is aware of the trim condition of the control surface by the same means as in normal non-augmented non-automatic flight.

Other objects, features and structural details of the invention will become apparent from the following description in relation to the accompanying drawings in which:

Fig. 1 is a schematic view of the mechanical and electrical components forming the system and the circuitry for the related electrical parts; and Fig. 2 is a detail schematic view of the adjustable block in its lowest or locked position.

With reference to Fig. 1, the fixed locations of the frame of the dirigible craft employing the servo system are indicated at 10. Steering control means or steering member 11 may be the elevator control surfaces of an aircraft that are moveable to change the attitude of the craft about its pitch axis, for example. As shown, control surface 11 is pivotally mounted on the fixed frame 10 of the craft. The power motor or motive means 12 of the system is operatively connected through connecting link 13 to the control surface 11 with a pivotal connection at 14. The power motor 12 is a hydraulic power actuator of a conventional type in which the cylinder housing 15 is mounted to move relative to a fixed piston 16 whose rod 17 extends exteriorly of the cylinder housing 15 and is pivotally mounted to the frame 10 of the craft as designated at 18 in a manner similar to that shown in copending patent application Serial No. 580,957, entitled "Automatic Pilot and Manual Booster Control System for Dirigible Craft" of Zupanick et al., filed April 26, 1956 and assigned to the same assignee as the present invention.

The element corresponding to the hydraulic motive means for operating the power motor 12 may be provided as shown by a conventional spool type balanced control valve designated at 19 mounted on or integrally with the housing 15. The valve 19 is supplied with fluid at a constant high pressure from a suitable fluid pump source (not shown) by way of intake conduit 20. Valve 19 is of such a character that the power motor 12 operates at a velocity that is substantially proportional to the displacement of the valve spool 21 from its neutral position in which the lands 22 and 23 of the valve cover the ports 24 and 25 controlling passage of the fluid to, and exhaust of the fluid from, the power motor 12. The exhaust conduits for the valve 19 are indicated at 26 and 27, the same returning the fluid from the motor 12 to a suitable sump (not shown).

The housing for the valve 19 may be formed as a part of the housing 15 of the motor 12, so that these elements of the system will move as a unit. With the movement of the valve spool 21 to the right as viewed in the drawing, high pressure fluid from conduit 20 is admitted to the portion of the cylindrical housing 15 of motor 12 to the right of piston 16 by way of port 25. At the same time, the fluid to the left of the piston 16 is connected to the sump by way of ports 24 and 26 and conduit 27. The power motor housing 15 together with the control valve housing is consequently urged to the right to follow the motion of the valve spool 21 until port 25 is covered by land 23 and port 24 is covered by land 22. The power motor when so operated, urges the pivot 14 to the right which through link 13 rotates the control surface 11 clockwise about the pivot point connected to the control surface and to air frame 10 to provide down elevator. A reversal of the initial motion of the valve spool 21 from its neutral position, will result in a reversal of the described operation and cause the power motor to provide up elevator.

A manually operable control member indicated as control stick 28 with control wheel 28a is mounted pivotally to the frame 10 of the aircraft at 29. The stick 28 is connected at pivot 30 to connecting link or push rod 31. The push rod 31 is connected pivotally at 32 to the case 34 of a safe control mechanism 33. The case 34 of the mechanism 33 is mounted pivotally at 35 to an extension arm 36 of the servo motor housing 15. When block 37, which has a V shaped opening therein, of the safe control 33 is all the way down as viewed in Fig. 1, and shown more clearly in Fig. 2, the tapered sides of the V opening of block 37 make contact with pin 38. Pin 38 is mounted in an extension of valve stem 39 which is attached pivotally at 39a to valve spool 21. The block 37 is free to be driven vertically within guides 40 mounted on the case 34, but not horizontally with respect to the case 34 as viewed in the figure. Therefore, whenever the block 37 is in contact with pin 38, the pilot has a direct mechanical connection to the valve spool 21 through the connection at 39a to the pin holder 39 to the pin 38 to the block 37 to the case 34 of the safe control 33 through pivotal connection 32 to rod 31 through pivotal connection 30 to stick 28, pivoted at 29 with respect to the aircraft's frame 10, to the pilot's wheel 28a.

Pin 38 is slidably supported in slot 36a of the extension arm 36 used to mount the safe control 33 at pivot 35. The clearance between pin 38 and slot 36a of arm 36 is kept small, i.e. in the order of .002 inch, in the vertical direction, as viewed in the diagram such that the slot 36a supports the pin 38 and motion of valve spool 21 causes the pin 38 to slide in slot 36a. The clearance in the lateral direction as viewed in the drawing between slot 36a and pin 38 is kept to maximum valve travel required. Thus, neither electrical nor mechanical coercion can cause the valve spool 21 to travel more than some predetermined amount.

A direct manual control of the control surface is available to the pilot in the event hydraulic pressure fluid is not supplied to the system due to hydraulic or electrical system malfunction or other reason. In this condition, the block 37 will be in intimate contact with pin 38 by an operation to be described later. The force applied by the pilot to control stick 28 is transmitted through rod 31 to the case 34 of safe control 33 to block 37 which positions pin 38 in slot 36a. Depending upon the direction of the force applied to the control stick 28, the pin 38 will be brought into contact with either the right or the left end of slot 36a as viewed in the drawing. When the pin 38 contacts the end of slot 36a, the force applied will be transmitted to arm 36 of cylinder housing 15 to position the cylinder housing in accordance with the direction of the applied force. In a manner similar to that described previously, the movement of the cylinder housing 15 will be transmitted to connecting link 13 through pivot 14 to control surface 11 to provide an upward or downward control surface deflection depending upon the direction and magnitude of the force applied to the control stick 28. A conventional means of porting fluid from one side of piston 16 to the other to prevent hydraulic lock in the event of system malfunction is indicated as bypass valve 104.

The adjacent ends of feel springs 41 and 42 are connected to rod 31 through arm 43 and provide artificial feel for the pilot-generated forces at control stick 28. The remote ends of feel springs 41 and 42 are connected to bracket 44 which is positionable with respect to the aircraft frame 10 through the worm gear 45, motor 46 and motor drive 46a as indicated in the preferred embodiment shown in Fig. 1. The characteristics of the feel springs 41 and 42 are not necessarily linear and in certain embodiments their stiffness may depend on the craft's flight condition. The operation of the artificial feel device generally indicated at 99 will be more fully described later.

Thus, with hydraulic pressure applied to the system a force to the right with reference to Fig. 1 on wheel 28a will be balanced by springs 41 and 42 and the deflection of control stick 28 will be determined by the spring constants of 41 and 42. This force, therefore, will move wheel 28a, stick 28, rod 31, case 34, block 37, pin 38, and valve spool 21 in that order, each an amount determined by the dimensions and characteristics of the linkages. As previously described, motion of the valve spool 21 causes housing 15 to move in the direction of the valve motion, and therefore move control surface 11. Thus, pulling the stick back (to the right) will move the control surface up or counterclockwise as viewed in Fig. 1.

In the manual mode of control, the direct mechanical operation and direct mechanical operation with hydraulic boost have been described above. It is also possible in the manual mode to obtain a multiple input effect in the form of stability augmentation. Stability augmentation may be described as a mode of operation in which the control surface responds to two or more inputs, one of which is a function of the position of the pilot's control member. The second input is usually a stabilizing signal which in a preferred embodiment of the invention has a limited authority as will be described later.

The stabilizing signal as indicated in the drawing is produced in rate sensor 66 which provides signals in accordance with the rate of the craft's deviation from a predetermined attitude. The control gyro 62 is a reference means for providing signals in accordance with the deviations of the craft from a predetermined attitude, flight path or condition. The rate sensor 66 and the control gyro 62 comprise conventional automatic pilot reference components and as such any suitable equivalent may be substituted or combined to provide corresponding signals. In certain embodiments, a single reference means may be used in conjunction with electrical circuiting to provide the necessary higher derivatives of the displacement signal or integrals of rate or acceleration signals. Attitude commands are shown being inserted into the control gyro 62 to precess or bias the control gyro to provide a new attitude reference. Any other method of changing the attitude reference could be used that is convenient including manual or automatic adjustments.

In certain embodiments of the invention, the signals may be supplied by a means for providing signals in accordance with craft deviations from a predetermined flight condition. This could be accomplished as indicated in the drawings or by substituting conventional altitude, radio navigation, or other flight condition reference components for the attitude reference components shown in the drawings in a manner obvious to one skilled in the art.

In the drawing, the automatic and manual positions of the two position switches, 60a, 60b and 60c, are respectively indicated by the designations (A) and (M). As shown, the arms of the respective switches, 60a, 60b and 60c, are interconnected by suitable mechanical connections 60d, so that the same may be set by a command knob designated at 60 in relation to switch 60a. The knob 60 may be located on the instrument panel, the automatic pilot flight controller, the control stick or any other suitable location. In a similar manner, the engage and disengage positions of the two position switches 84a and 84b are respectively indicated by the designations (Eng) and (Dis). The operation of the switches by knob 84 through mechanical connection 84c is also similar to the above.

In the manual mode with stability augmentation, pressure fluid and electrical power are supplied to the system. With the switches 60a, 60b and 60c in the position "M" and switches 84a, 84b in the engage (Eng) position, synchro 57 and control gyro 62 are out of the circuit. The output of synchro 64 is coupled to amplifier and detector 56, and D.C. voltage is supplied to the safe control locking mechanism solenoid 93. The safe control amplifier and detector 82 is coupled to the safe control block positioning servo loop, and the trim system is operated manually by the pilot through a conventional means not shown. The operation of the above elements will be explained in greater detail later.

When the block 37 is raised from contact with the pin 38 by a manner to be described, the valve spool 21 may be stroked by the torque or servomotor 47 in accordance with electrical signals received thereby within the limits defined by block 37. As shown, the torque motor 47 may be of the character described and shown in U.S. Patent No. 2,426,608, issued September 2, 1947 to P. Halpert et al. The pole-providing magnetic stabilizer element 48 of motor 47 is fixedly mounted on a plate 49 connected to housing 15. The movable element armature 50 is rockably mounted at pivot 51 on plate 49 for limited movement in the gaps between the pole faces of the pole-providing stator element 48. Lever element 52, adapted to move with movement of the armature 50, is operably connected to valve stem 39 of valve spool 21 to provide valve deflection which is proportional to the input signal to the torque motor 47. Balance springs 53 and 54 are connected to housing 15 through plate 49 and valve 19, respectively, and also to arm 52. Lead 55 connects the torque motor 47 to the output of the automatic pilot and stability augmentation amplifier and detector 56 shown diagrammatically in Fig. 1, the operation of which will be more fully described later.

The amount of travel by control surface 11 instantaneously available in response to the signals from the amplifier and detector 56 is determined by the position of block 37 in case 34 of the safe control 33. Safe control mechanism 33 functions as an adjustable authority coupling device or authority modifying means in a manner to be explained. The amount of authority instantaneously available may be controlled by positioning block 37 up and down within the housing 34. The position of block 37 determines the instantaneous displacement limits of the valve spool 21 and thus the control surface 11 in either direction in response to control signals exceeding predetermined limits. With block 37 raised from pin 38 in a manner to be described, torque motor 47 can coerce the valve spool 21 in response to electrical signals below a predetermined magnitude and thus move power motor 12 and control surface 11 accordingly. With pivot 32 on the safe control housing 34 held fixed by the feel springs 41 and 42, as the pivot point 35 on the power motor housing extension 36 moves, the gap between the pin 38 and the V in block 37 will become smaller and, if the signals into torque motor 47 exceed predetermined limits as established by the piston of block 37, will ultimately result in contact between the pin 38 and block 37. As the power motor 12 continues to move carrying point 35 with it, the block 37 will force the valve 21 through the stem 39 and pin 38 to return to its center position with lands 22 and 23 covering ports 24 and 25, respectively. Thus, the initial travel of the power motor 12 and control surface 11 in response to signals into torque motor 47 is limited by the clearance between the block 37 and the pin 38.

The position of the block 37 is controlled by a servo system operable in accordance with authority limit commands. Authority limit commands may be inserted into the system manually at the discretion of the pilot or automatically as a function of a particular flight condition or combination of conditions and may remain fixed or be variable. Authority limit commands are introduced into the servo system by wires 86 which are coupled to the input of safe control amplifier and detector 82. With the switch 84a in the engage position, the output of the amplifier and detector 82 is transmitted through wires 83, switch 84a and wires 85 to motor 70. Motor 70, mounted in case 34, is driven in accordance with the magnitude and polarity of the output of the amplifier and detector 82 and drives shaft 72 through gear train 71 in accordance therewith. Shaft 72 rides in and is supported in the case 34 by bearing 73 and collar 74 on the shaft 72. Shaft 72 is coupled to shaft 75 by a splined coupling so that shaft 75 can slide up and down on shaft 72, and remain in fixed angular relation therewith. Shaft 75 is threadedly coupled to block 37 by a lead screw connection. Shaft 75 is also connected to collar 76 by bearing 77. The collar 76 is restrained from moving down as shown in the diagram by the latch mechanism generally indicated at 78, to be described later, and from moving upward by the spring 79 between the collar 76 and the safe control case 34. Thus, when the motor rotates, the block 37 is driven within guides 40 up or down by the lead screw on shaft 75 through the splined coupling on shaft 72.

To provide a feedback signal to the safe control amplifier and detector 82, the arm 37a connected to block 37 forms the armature of a linear position transducer shown at 80 which is mounted in the case 34. The feedback signal from the linear transducer which is proportional to the position and movement of the block 37 is sent through wires 81 to the amplifier and detector 82. When the feedback signal is equal and opposite to the authority limit command signal, the block 37 will remain in a fixed position.

The function of the latch mechanism 78 is to provide a safety engage mechanism in the event of electrical or hydraulic malfunction to position block 37 such that it will instantaneously engage pin 38. The latch mechanism 78 is attached to collar 76 by arm 87. Arm 87 is rotatably coupled to rocker 88. Rocker 88 is pivoted on an extension of the case 34 at pivot point 89. A pin 90 is rotatably inserted in rocker 88 at the end opposite to arm 87. The pin 90 engages the dog 91 which is pivotally mounted at 92 on the case 34. A solenoid 93 mounted on the case 34 is coupled to the dog 91 by arm 94. The dog 91 is also spring-connected to the case 34 by spring 95. Spring 95 is preloaded to pull to the left as shown in the diagram opposing the pull force of the solenoid 93. A switch 96 is also mounted on the safe control case 34. Switch 96 is held open by solenoid 93 when the latter is energized when the system is operating normally, the operation of which will be more fully described later.

When power is removed from the solenoid 93, the spring 95 will rotate the lever 91 clockwise as shown in the diagram about pivot 92. The dog 91 will then disengage the pin 90 on rocker 88 allowing the rocker to pivot about point 89. The spring 79 will instantaneously force the collar 76 down, pulling the arm 87 and rocker 88 with it. The shaft 75 will be forced down and will slide in the splined connection between shafts 75 and 72, thus forcing block 37 into contact with the pin 38. The pilot will then have a direct mechanical connection from the control stick 28 to the pin 38, and thence to the valve spool 21 or actuator housing 15, and can then operate the actuator 12 as previously described.

Instantaneous mechanical override in the event of electrical or hydraulic failure is also provided. A pressure operated switch 100 is mounted in the pressure fluid in-take conduit 20 such that the contacts of switch 100 are closed whenever the pressure in the in-take conduit 20 is more than a predetermined value, for example, one-half the normal operating value. Pressure operated switch 100 is coupled in series with switch 84b through wires 101 and is also coupled to solenoid 93 through wires 102. Thus, when switch 84b is in the engage position, approximately 27 volts D.C. is supplied to the solenoid 93 to hold in dog 91 whenever the operating fluid pressure supplied to the actuator is more than one-half the normal value.

In the event of hydraulic failure, switch 100 will open, solenoid 93 will drop out and the safety engage latch mechanism 78 will become inoperative for latching purposes and switch 96 will be closed. In the event of electrical power failure of the D.C. power, solenoid 93 will also drop out, mechanism 78 will become inoperative for latching purposes and switch 96 will be closed. In the event of a malfunction, the block 37 positions the pin 38 and consequently the valve 19 in a direction to align the control surface 11 with the control stick 28. If the malfunction is electrical, hydraulic pressure fluid is available; if the malfunction is hydraulic, some residual hydraulic power will be available, depending upon the setting of the pressure operated switch 100 and the particular malfunction.

When switch 96 is closed, A.C. power is first supplied to the system through switch 96, through wires 98, and a precycle mode of operation is initiated when switch 84a is in the disengage position. Power is then supplied to the motor 70 through switch 96, wires 97, switch 84a and wires 85. This power is in such a direction as to drive the block 37 downward, as shown in the diagram. However, the block 37 is already in contact with the pin 38 due to the operation of the safety engage mechanism previously described. Therefore, the motor will drive the lead screw 75 in a direction to move collar 76 upwards, which will compress spring 79. Moving the collar 79 upward, moves the arm 87 upward and rotates rocker 88 about pivot 89. The pin 90 in rocker 88 will engage sloping face 103 of dog 91. Further downward motion causes the pin 90 to roll down the face 103 which moves the dog 91 counterclockwise extending spring 95 until the bottom of dog 91 makes contact with switch 96, opening the switch and disengaging the A.C. power to the motor 70. Therefore, whenever A.C. power is available and switches 84a and 84b are in the disengage position, the motor 70 will run until switch 96 is opened by dog 91. During this time, the block 37 will remain in contact with pin 38 and at the end of the cycle, the safety engage mechanism will be in an operable position.

Positioning switches 84a and 84b to the engaged condition will supply D.C. power to the solenoid 93 if pressure fluid is available to the actuator 12 and switch 100 is closed. The solenoid forces will hold the dog 91 against spring 95 such that the dog 91 will house pin 90, thus preventing downward motion of of the collar 76. The safe control amplifier and detector 82 is also connected into the servo loop to drive the motor 70 and the servo loop will then position the block 37 in accordance with authority limit command signals to free pin 38 so that the torque motor 47 can stroke the valve spool 21 and operate as previously described.

In the manual mode of operation with stability augmentation therefor, the block 37 is raised from contact with pin 38 by an amount controlled by the authority limit command servo loop. The authority allowed with respect to the signals generated in the autopilot electrical system is determined by the relative position of the pin 38 with respect to the tapered sides of the V within the block 37. As previously described, this may be varied by positioning the block 37 up or down in the case 34 to allow more or less authority, respectively, to the electrical system. When in the manual mode with stability augmentation with the block 37 raised from pin 38, motions of the pilot's control stick 28 will result in corresponding motions at the control surface. This is accomplished by the pilot's moving the control stick 28 which will move the case 34 through the connecting link 31 which in turn will pivot around point 35 as previously described.

A signal generating means comprising a synchro 64 whose stator is connected to the extension arm 36 of the cylinder housing 15 and whose rotor is connected through gearing to the case 34 at pivot point 35, measures the position and movement of the case 34 with respect to the cylinder housing 15. When the switch 60c is in the M position, the signal generated in synchro 64 is transmitted through wires 65 to the amplifier and detector 56. The output of the amplifier and detector 56 is transmitted through wires 55 to servomotor 47 to position the valve spool 21 and ultimately the control surface 11 in a manner previously described. Thus, synchro 64 may be used as the control surface position sensor since the sensing occurs with respect to the position of the pilot's control, and motions of the pilot's control will result in corresponding motions at the control surface if the block 37 is raised from pin 38. The control surface actuation will be brought about by the electrical valve stroking system described above and will, in the absence of other signals in the electrical loop, only be satisfied by returning the signal from synchro 64 to zero. This can only occur when the surface 11 and the stick 28 move corresponding amounts with respect to the craft frame including the appropriate linkage ratios. Therefore, synchro 64 in effect measures the error between the control stick 28 and the control surface 11.

The stability augmentation signal may be obtained from a craft attitude rate sensor 66 or other suitable device which will provide stabilizing signals through wires 66a to the stability augmentation amplifier and detector 56. The output from the amplifier and detector 56 will therefore be a summation of signals from the rate sensor 66 and the synchro 64, with the primary command signals being introduced through the control stick 27 via synchro 64 and the stabilizing signals being introduced from rate sensor 66. Under certain conditions, the stabilizing signals may not be reflected back to the pilot's stick and the pilot will be conscious only of the steady state stick position rather than the high frequency signals introduced by the rate sensor. The introduction of signals from the rate sensor 66 to amplifier 56 requires that synchro 64 produce an equal and opposite signal for the system to reach equilibrium. Thus, the signal from the rate sensor 66 will produce motions of control surface 11 with respect to the position of the pilot's control. The total control surface excursion allowed with respect to the pilot's controls is determined by the clearance between pin 38 and block 37, as described before. Thus, the servo system is able to respond to the sum of two or more commands, one of which is the pilot's input, and to limit the motion of the actuator to other signals with respect to the pilot's control.

In the automatic mode of control, it is also possible to obtain a multiple input effect in the form of damping signals combined with automatic pilot signals. The damping signals may be generated in a sensor such as the rate sensor 66. It is to be understood, however, that the sensor 66 is not necessarily restricted to sensing rate terms only, but may measure other terms depending upon the dynamics of the aircraft that would be useful for damping in the automatic manual mode of control and for stability augmentation in the manual mode of control.

Primary command signals in the automatic mode are generated in an automatic pilot means which may include attitude and rate sensors previously described that may provide a summated signal to the servomotor. This is schematically indicated in the drawing as a control gyro 62 which accepts attitude commands that may precess or bias the gyro such that, with switch 60b in the "A" position, signals from the control gyro 62 are generated in accordance with proportional deviations of the craft 10 from the reference attitude as sensed by the control gyro. This signal is transmitted to the automatic pilot and stability augmentation amplifier and detector 56 through switch 60b by wires 63. A signal from the rate sensor 66 is also introduced into the amplifier and detector 56 through leads 66a. The output from the amplifier and detector 56 which is the summated and amplified signal equivalent to attitude displacement and rate damping is sent by wires 55 to the servomotor 47 which strokes valve 19. Moving the valve 19 within the limits allowed by the adjustable coupling device urges the actuator 15 and thus the control surface 11 as described above.

A signal generating means consisting of a feedback synchro 57 whose stator is connected to the aircraft frame 10 and whose rotor is connected to the control surface 11 through gearing 58, measures the position of the surface 11 with respect to the craft's frame 10. The signal is sent through wires 59 to switch 60a. Wires 61 connect switch 60a to the input to amplifier and detector 56 whenever the switch 60a is in the position labeled "A."

The control surface moves until the signal from feedback synchro 57 sent through wires 59, through switch 60a in the "A" position, through wires 61 to the amplifier and detector 56, is equal to the signal at wires 63 and 66a, from the control gyro 62 and rate sensor 66, respectively. The control surface produces a rate of change of craft attitudes such as to return the signal from the control gyro 62 and rate sensor 66 to zero. An external command to the control gyro 62 will cause a pitch change to ratify the external system by the sequence of operations described above.

If the external command causes the control gyro 62 to precess and commands a control surface motion which is larger than that allowed by the relative position of the pin 38 and block 37 in the safe control 33, i.e., an electrical control signal in excess of a predetermined magnitude, then the control surface 11 will be limited in its motion by the position of the pilot's controls 28 which in turn is controlled by the feel springs 41 and 42 and the position of the trim system 99. In order that larger control surface motion be available, the trim motor 46 must be driven to keep the position of the block 37 symmetrical about pin 38. Synchro 64, whose stator is connected to the actuator housing 15 and whose rotor is connected to the safe control housing 34, measures the angular position of the safe control 33 with respect to the actuator housing 15. The signal from synchro 64 is sent through wires 65 to switch 60c, and with switch 60c in the "A" position, through wires 67 to the trim amplifier and detector 68 where it is amplified and sent to the trim motor 46 by wires 69. The trim motor 46 is driven at a constant velocity for a given voltage from the trim amplifier and detector 68. Therefore, whenever switch 60c is in position "A," the signal from synchro 64 will cause the trim motor 46 to be driven, which in turn slowly drives the trim feel frame 44 through the gears 45. Movement of frame 44 causes the springs 41 and 42 to apply forces to the rod 31 through arm 43.

Rod 31 will follow arm 43 to reduce the forces in feel springs 41 and 42 to zero. Movement of rod 31 will cause the safe control case 34 to move in such a direction to reduce the signal from the synchro 64 to zero. In addition, movement of rod 31 will move the pilot's control 28 and 28a. When the trim system has moved sufficiently to cause the signal from synchro 64 to go to zero, then the trim system will stop moving. Whenever the signal from synchro 64 is zero, the block 37 will be symmetrically disposed about the pin 38. Thus, the synchro 64 and the trim and feel system will act as a follow-up to keep pin 38 and block 37 out of contact to provide the same predetermined authority limits with respect to a new reference point about which the system now operates. This system of automatic trim will also keep the stick position 28 and the surface 11 aligned. Thus, the output from the synchro 64 is a measure of the error between the control stick and the control surface.

Therefore, for commands from the control gyro 62 in excess of a predetermined magnitude, the control surface 11 will move immediately as far as permitted by the block 37 in the safe control 33, and the relative position of the pin 38 attached to the valve spool 21 of actuator 12. Movement of the actuator housing 15 will cause a signal to be generated in synchro 64 which will slowly drive the trim system to rotate the safe control 33 to restore it to its normal angular relationship with respect to the housing 15 as described above to permit further motion of the valve 21 to allow the control surface to achieve its desired position as determined by the signal from the control gyro 62, rate sensor 66 and the feedback synchro 57.

Thus a system has been described in which a single power motor performs functions of a manual power booster, damper servomotor and automatic pilot servomotor with the servomotor authority controlled and adjustable while having instantaneous safety override features in the event of hydraulic or electrical malfunction.

While the system has been described as applied to an aircraft, the invention may readily be adaptable to all forms of dirigible craft and vehicles. Depending upon the characteristics of the craft and the desires of the operator, the dynamics of the system may be varied to suit the prevailing conditions. For example, the dynamics with which the pilot's controls follow the control surface in the automatic pilot mode is determined by the speed of the trim follow-up loop. For maximum safety it is desirable for the loop to be slow and usually the trim motors in aircraft are slow. However, there is nothing inherent in the servo system which prevents the stick from following the high frequency motion of the surface if the trim motor is fast enough and the feel springs stiff enough.

While the invention has been described in its preferred embodiments, it is to be understood that the words which have been used are words of description rather than of limitation and that changes within the purview of the appended claims may be made without departing from the true scope and spirit of the invention in its broader aspects, for example, the invention is applicable to pneumatic control systems as well as analogous electromechanical control systems.

What is claimed is:

1. In a dirigible craft, the combination of, a steering control member, a power actuator drivably coupled to position the steering control member, motive means for operating the power actuator, automatic pilot means for providing a control signal to said motive means, means providing a feedback signal to the automatic pilot means in accordance with the movement of the steering control member, an adjustable authority coupling device for controlling the movement of said motive means, means for controlling the adjustable authority coupling device, a manually operable member, linkage means connecting the manually operable member and the adjustable authority coupling device, artificial feel means resiliently coupled to the linkage means including a motor drivably connected thereto, and means providing a signal to said artificial feel motor in accordance with the relative condition of the adjustable authority coupling device and the power actuator for slowly positioning the adjustable authority coupling device in a direction to permit the steering control member to be further positioned.

2. A combination as claimed in claim 1 in which the means for controlling the adjustable authority coupling device includes means for providing authority limit command signals and a servo system operable in accordance with said authority limit command signals for adjusting the authority limits of said adjustable authority coupling device.

3. A combination as claimed in claim 2 in which the means for controlling the adjustable authority coupling device includes a safety engage mechanism coupled to said adjustable authority coupling device for zeroing the authority limits in the event of system malfunction and precycling means coupled to the safety engage mechanism for repositioning the safety engage mechanism after malfunction.

4. In an aircraft control system, the combination of, a steering control member, a power element drivably coupled to said steering control member, a primary balanced valve for operating the power element having a rod extending from both ends of the valve, a motor operatively connected to one end of the balanced valve, automatic pilot means including attitude and rate sensors for providing a summated signal to said motor, an adjustable coupling device coupled to the other end of the balanced valve for limiting the movement thereof, a control stick adapted for manual positioning pivotally coupled to the adjustable coupling device, artificial feel means yieldingly connected to the control stick including an actuator drivably connected thereto, first signal generating means including means for providing a signal to said artificial feel actuator in accordance with the differential positioning of the adjustable coupling device and the power element, and second signal generating means including means for providing a feedback signal to the automatic pilot means in accordance with the movement of the steering control member.

5. In an aircraft with a manually operable control member and a steering control member, a manual booster and automatic pilot servo system; the combination of, automatic pilot means for providing control signals including a servomotor responsive to said signals, first signal generating means for providing a feedback signal in accordance with the position of the steering control member to said automatic pilot means, a power actuator operatively connected to position said steering control member, means responsive to said servomotor for operating said power actuator, adjustable authority means controllably coupled to said power actuator and to said means for operating said power actuator, connecting means between said manually operable control member and said adjustable authority means, second signal generating means for providing a signal in accordance with the relative movement of the power actuator and the adjustable authority means, and a stick feel device including a movable element yieldingly coupled to said connecting means and a motor drivably connected to said element responsive to the signal from said second signal generating means for slowly positioning said adjustable authority means in a direction to allow further movement of said steering control member.

6. A control system for dirigible craft having a manually operable means and also having a power motor connected to the steering control means of the craft, in combination, authority modifying means for modifying the authority of said system, means coupling said manually operable means to said power motor through the authority modifying means, means for providing a signal in accordance with the relative position of the manually operable means and the steering control means as modified by the authority modifying means, and means responsive to said signal for controlling said power motor in accordance therewith as modified by said authority modifying means.

7. A system as claimed in claim 6 including, means for varying said modifying means to control the degree of authority in the system.

8. A system as claimed in claim 7 in which the means for varying said modifying means includes means for providing authority limit command signals and a servo system operable in accordance with said authority limit command signals for modifying the authority limits of said authority modifying means.

9. A system as claimed in claim 8 including means coupled to said authority modifying means for overriding said modifying means consisting of a safety engage mechanism operable in event of system malfunction for zeroing the degree of authority and a precycling means coupled to said safety engage mechanism for repositioning the safety engage mechanism after malfunction.

10. A control system for dirigible craft having manual means for establishing an instantaneous reference and a steering control member comprising power means for positioning said steering control member, control means for providing an output for controlling said power means, automatic pilot means, said control means being responsive to said manual means and to said automatic pilot means for producing said output, and adjustable authority means for limiting the output of said control means to a selectable deviation over the range of zero to unlimited deviation with respect to the instantaneous reference established by the manual means.

11. A system as claimed in claim 10 including means coupling said manual means to said power means through said adjustable authority means, a signal generating means for providing a signal in accordance with the relative position of said adjustable authority means and said power means, an artificial feel means yieldingly coupled to said coupling means, and motive means responsive to said signal and connected to position said artificial feel means in accordance therewith whereby the adjustable authority means is positioned to maintain the control means in a centralized condition with respect thereto.

12. A control system for aircraft having a steering member comprising a power motor connected to operate a craft steering member, means for operating said power motor, an automatic pilot having a source of control signal and a servomotor responsive to said signal source, a variable authority element having a limit providing and centralizing part cooperable with said means for operating the power motor, a pin member connected to the power motor operating means cooperable with said variable authority element part, means for controlling the adjustment of the variable authority element with respect to the pin member, means providing a signal proportional to the relative motion of the variable authority element and said power motor, and a control stick having a feel device yieldingly connected thereto controlled by the signal from said latter signal providing means whereby the position of the control stick is indicative of the position of the steering member and the pin member is positionably maintained in a centralized position relative to the variable authority element part.

13. In an actuator for positioning a controlled member, the combination of a first motive means in controlling relation to the controlled member, a second motive means operably coupled to control the first motive means, a third motive means operably coupled to control the second motive means, adjustable authority means mounted on the first motive means in adjustable controlling relation to the second motive means, said adjustable authority means including means for varying the adjustable authority means to control the degree of authority of the second motive means over the range of complete elimination of authority to unlimited authority whereby the extreme condition of the controlled member is selectably determined by the limiting condition of the second motive means.

14. An actuator as claimed in claim 13 in which the means for varying the adjustable authority means includes means for providing authority limit command signals and a servo system operable in accordance with said authority limit command signals for adjusting the authority limits of said adjustable authority device.

15. An actuator as claimed in claim 14 including means coupled to said adjustable authority means for overriding said adjustable authority means consisting of a safety engage mechanism operable in event of malfunction for zeroing the degree of authority and a precycling means coupled to said safety engage mechanism for repositioning the safety engage mechanism after malfunction.

16. In a hydraulic actuator for controlling a positionable member, the combination of a first hydraulic motive means in controlling relation to the positionable member, a second hydraulic motive means operably connected to control the first hydraulic motive means, a servomotor operably connected to control the second hydraulic means, adjustable authority means mounted on the first hydraulic means in adjustable controlling relation to the second hydraulic motive means, said adjustable authority means including means for varying the adjustable authority means for controlling the degree of authority of the second hydraulic motive means over the range of complete elimination of authority to unlimited authority whereby the extreme condition of the positionable member is selectably determined by the limiting condition of the second hydraulic motive means.

17. In a hydraulic actuator as claimed in claim 16 in which the means for varying the adjustable authority means includes means for providing authority limit command signals and a servo system operable in accordance with said authority limit command signals for adjusting the authority limits of said adjustable authority means.

18. In a hydraulic actuator as claimed in claim 17 including means coupled to said adjustable authority means for overriding said adjustable authority means consisting of a safety engage mechanism operable in event of malfunction for zeroing the degree of authority and a precycling means coupled to said safety engage mechanism for repositioning the safety engage mechanism after malfunction.

19. In combination with an actuator, a safe control mechanism comprising authority limit means providing a signal in accordance with authority limit commands, motive means responsive to the authority limit signal, power transmission means drivably coupled to the motive means having a shaft extending therefrom, a lead screw device drivably coupled to the shaft for rotational and translational movement, a block positioned by the lead screw having a V shaped opening therein cooperative with an element on the member to be controlled, and signal generating means cooperative with the block providing a feedback signal to the authority limit means in accordance with the movement of the block.

20. A safe control mechanism as claimed in claim 19 including means for overriding the authority limit means consisting of a safety engage mechanism operable in event of malfunction and a precycling circuit means for repositioning the safety engage mechanism after malfunction.

21. A safe control mechanism as claimed in claim 20 including a resiliently restrained latching mechanism disposed in controlling relation to the block and lead screw device and monitored by an electrical holding device and switching circuit.

22. A control system for dirigible craft having a steering control member comprising a power motor having a positionable member connected to position the steering control member, means for providing control signals, control means responsive to said control signals connected to normally control the power motor for positioning the steering member in accordance with said control signals, limiting means for initially limiting the displacement of the steering control member in response to control signals exceeding predetermined limits, and means connected to the limiting means and responsive to its movement for slowly modifying the position of the limiting means to permit the steering control member to be further positioned in accordance with the control signals.

23. A control system for dirigible craft comprising a hydraulic motor having a piston fixed with respect to the craft and a movable housing, a steering control member connected to be positioned by said housing, a hydraulic valve mounted on said housing having a positionable valve spool for controlling the supply of hydraulic fluid to the hydraulic motor, means for producing a control signal, an electromechanical transducer having a movable member connected to be responsive to said control signal for positioning said valve spool in accordance therewith, limiting means positionably mounted on the housing of the hydraulic motor and mechanically effective to limit the displacement of the valve spool in either sense over the range of zero movement to unlimited movement, and means for varying the position of said limiting means with respect to said housing for adjusting the limiting means within said range to slowly permit the steering control member to be further displaced in accordance with the control signals.

24. A control system as described in claim 23 wherein said limiting means includes a differential lever device, said system further including a manually operable controller for controlling the steering control member, linkage means, said differential lever device being pivoted at one end on the housing and connected at its other end through the linkage means to the manual controller, wherein said means for varying the position of said limiting means includes artificial feel means resiliently connected to the linkage means, and motive means connected for positioning the artificial feel means whereby, when the valve spool is displaced by a control signal exceeding a predetermined magnitude so as to cause the valve spool to engage the limiting means, the resulting displacement of the housing causes the limiting means to position the valve spool to shut off the supply of fluid before the steering control member has been displaced by an amount corresponding to the control signal and the motive means slowly adjusts the zero of the artificial feel means to rotate the differential lever device to restore it to its normal angular relationship with respect to the housing.

25. A control system as described in claim 24 including a pick-off device for providing a signal that is a measure of the angular displacement of the differential lever device from a predetermined angular relationship with respect to the housing, and means responsive to said pick-off signal for energizing the motive means to adjust the zero of the artificial feel device in a direction to reduce the output from the pick-off device toward zero.

26. A control system as described in claim 25 including means for adjusting the limiting means to vary the extent of permissible displacement of the valve spool in response to the control signal.

References Cited in the file of this patent
UNITED STATES PATENTS

| | | |
|---|---|---|
| 2,638,288 | Hanna | May 12, 1953 |
| 2,678,177 | Chenery et al. | May 11, 1954 |
| 2,725,203 | Blatz et al. | Nov. 29, 1955 |
| 2,773,660 | Rasmussen | Dec. 11, 1956 |